United States Patent
Wu et al.

(10) Patent No.: US 11,523,039 B2
(45) Date of Patent: Dec. 6, 2022

(54) VIRTUAL REALITY HEAD-MOUNTED APPARATUS

(71) Applicant: ADVANCED NEW TECHNOLOGIES CO., LTD., Grand Cayman (KY)

(72) Inventors: Jun Wu, Hangzhou (CN); Huanmi Yin, Hangzhou (CN); Hong Zhang, Hangzhou (CN); Xiaodong Zeng, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 58 days.

(21) Appl. No.: 16/527,978

(22) Filed: Jul. 31, 2019

(65) Prior Publication Data

US 2019/0354758 A1 Nov. 21, 2019

Related U.S. Application Data

(63) Continuation of application No. PCT/CN2018/077280, filed on Feb. 26, 2018.

(30) Foreign Application Priority Data

Feb. 27, 2017 (CN) .......................... 201710109091.6

(51) Int. Cl.
*G06K 9/00* (2022.01)
*H04N 5/232* (2006.01)
(Continued)

(52) U.S. Cl.
CPC ....... *H04N 5/2257* (2013.01); *G02B 27/0093* (2013.01); *G02B 27/0172* (2013.01);
(Continued)

(58) Field of Classification Search
None
See application file for complete search history.

(56) References Cited

U.S. PATENT DOCUMENTS 5,993,000 A 11/1999 Kobayashi et al.
9,329,387 B2 * 5/2016 Border ............... G02B 27/0172
(Continued)

FOREIGN PATENT DOCUMENTS

CN 102693437 A 9/2012
CN 103429143 A 12/2013
(Continued)

OTHER PUBLICATIONS

Search Report for European Application No. 18757692.1 dated Nov. 19, 2019 (4 pages).
(Continued)

*Primary Examiner* — Michael E Teitelbaum

(57) ABSTRACT

Methods, systems, and apparatus, including computer programs encoded on computer storage media, for a virtual reality head-mounted apparatus are provided. One of the apparatus includes: an apparatus body being provided with a convex lens and a camera, the camera being located on a user side of the convex lens, and a lens of the camera facing an eye of the user to acquire eye pattern features of the user. The virtual reality head-mounted apparatus may acquire eye pattern features of the user without interrupting the displaying of virtual reality contents, and quickly and accurately perform identity verification on the user based on the eye pattern features.

14 Claims, 3 Drawing Sheets

(51) Int. Cl.
  *G02B 27/00* (2006.01)
  *G06K 9/20* (2006.01)
  *H04N 5/225* (2006.01)
  *H04N 5/247* (2006.01)
  *H04N 9/04* (2006.01)
  *G06F 21/32* (2013.01)
  *G02B 27/01* (2006.01)

(52) U.S. Cl.
  CPC ........... *H04N 5/23299* (2018.08); *H04N 9/04* (2013.01); *G02B 2027/0138* (2013.01)

(56) References Cited

U.S. PATENT DOCUMENTS

| | | | |
|---|---|---|---|
| 9,723,117 B2* | 8/2017 | Buckley | H04M 1/0266 |
| 9,788,714 B2 | 10/2017 | Krueger | |
| 9,811,908 B2* | 11/2017 | Raghoebardajal ... | G02B 27/017 |
| 9,829,707 B2* | 11/2017 | Border | G09G 3/003 |
| 9,857,595 B2* | 1/2018 | Costa | G02B 3/04 |
| 10,013,055 B2 | 7/2018 | Perek et al. | |
| 10,055,887 B1* | 8/2018 | Gil | G06F 1/163 |
| 10,220,181 B2 | 3/2019 | Giap et al. | |
| 10,488,917 B2* | 11/2019 | Ollila | G02B 27/0093 |
| 10,573,080 B2* | 2/2020 | Gromotka | G03H 1/2294 |
| 10,642,569 B2* | 5/2020 | Lin | G06F 3/16 |
| 2006/0017654 A1 | 1/2006 | Romo | |
| 2012/0056717 A1 | 3/2012 | Maharbiz et al. | |
| 2012/0206588 A1 | 8/2012 | Kishigami et al. | |
| 2013/0235169 A1 | 9/2013 | Kato et al. | |
| 2014/0055746 A1 | 2/2014 | Nistico et al. | |
| 2014/0266990 A1 | 9/2014 | Makino et al. | |
| 2014/0354953 A1 | 12/2014 | Chen et al. | |
| 2015/0009574 A1 | 1/2015 | Liesecke et al. | |
| 2015/0049013 A1* | 2/2015 | Rahman | G06F 3/011 345/156 |
| 2015/0054734 A1* | 2/2015 | Raghoebardajal ... | G02B 27/017 345/156 |
| 2015/0070489 A1* | 3/2015 | Hudman | G01S 17/32 348/135 |
| 2015/0185475 A1* | 7/2015 | Saarikko | G02B 6/34 382/117 |
| 2015/0309263 A2 | 10/2015 | Abovitz et al. | |
| 2016/0063767 A1 | 3/2016 | Lee et al. | |
| 2016/0080720 A1 | 3/2016 | Fullam | |
| 2016/0085302 A1 | 3/2016 | Publicover et al. | |
| 2016/0180591 A1 | 6/2016 | Shiu et al. | |
| 2016/0259986 A1 | 9/2016 | Yun et al. | |
| 2016/0267712 A1* | 9/2016 | Nartker | G06F 3/012 |
| 2016/0358181 A1* | 12/2016 | Bradski | G06F 3/011 |
| 2017/0082858 A1 | 3/2017 | Klug et al. | |
| 2017/0124309 A1 | 5/2017 | Tang | |
| 2017/0124392 A1* | 5/2017 | Gu | H04N 5/2257 |
| 2017/0140224 A1 | 5/2017 | Wilson et al. | |
| 2017/0235931 A1 | 8/2017 | Publicover et al. | |
| 2018/0032133 A1* | 2/2018 | Cho | G06F 3/013 |
| 2018/0053051 A1 | 2/2018 | Chen et al. | |
| 2018/0096503 A1 | 4/2018 | Kaehler et al. | |
| 2018/0203505 A1* | 7/2018 | Trail | G02B 27/0093 |
| 2018/0218211 A1 | 8/2018 | Ishioka et al. | |
| 2018/0239423 A1* | 8/2018 | Mardanbegi | H04N 5/2354 |
| 2019/0113968 A1 | 4/2019 | Huang et al. | |
| 2019/0258314 A1* | 8/2019 | Ollila | G02B 27/0172 |
| 2020/0050257 A1* | 2/2020 | Lee | A61B 5/00 |

FOREIGN PATENT DOCUMENTS

| | | |
|---|---|---|
| CN | 104793741 A | 7/2015 |
| CN | 104834852 A | 8/2015 |
| CN | 105068249 A | 11/2015 |
| CN | 105212418 A | 1/2016 |
| CN | 105653227 A | 6/2016 |
| CN | 105718046 A | 6/2016 |
| CN | 105955491 A | 9/2016 |
| CN | 205594581 U | 9/2016 |
| CN | 106203410 A | 12/2016 |
| CN | 106250749 A | 12/2016 |
| CN | 205844631 U | 12/2016 |
| CN | 106339087 A | 1/2017 |
| CN | 106406509 A | 2/2017 |
| CN | 205942608 U | 2/2017 |
| CN | 205942609 U | 2/2017 |
| CN | 106873159 A | 6/2017 |
| CN | 206249347 U | 6/2017 |
| CN | 206584119 U | 10/2017 |
| CN | 107562179 A | 1/2018 |
| DE | 202016104179 * | 8/2016 ........... G02B 27/017 |
| DE | 202016104179 U1 | 8/2016 |
| JP | H11-44862 A | 2/1999 |
| JP | 2011-069978 A | 4/2011 |
| JP | 2014-191386 A | 10/2014 |
| JP | 2016-105555 A | 6/2016 |
| TW | 201445212 A | 12/2014 |
| WO | 2012/172719 A1 | 12/2012 |
| WO | 2013/076994 A1 | 5/2013 |
| WO | 2015/198502 A1 | 12/2015 |
| WO | 2016/018488 A2 | 2/2016 |
| WO | 2016/191709 A1 | 12/2016 |
| WO | 2017/026371 A1 | 2/2017 |
| WO | 2017026371 A1 | 2/2017 |
| WO | 2018067357 A2 | 4/2018 |

OTHER PUBLICATIONS

Examination Report for European Application No. 18757692.1 dated Nov. 29, 2019 (7 pages).
First Office Action for Chinese Application No. 201710109091.6 dated Sep. 3, 2018 with English machine translation (13 pages).
Supplementary Search for Chinese Application No. 201710109091.6 dated Mar. 28, 2019 (1 page).
Second Office Action for Chinese Application No. 201710109091.6 dated Apr. 3, 2019 with English machine translation (12 pages).
Third Office Action for Chinese Application No. 201710109091.6 dated Sep. 17, 2019 with English machine translation (15 pages).
Non-final rejection and Search Report for Taiwanese Application No. 106140067 dated Oct. 15, 2018 (7 pages).
Written Opinion of the International Searching Authority and International Search Report for PCT Application No. PCT/CN2018/077280 dated May 25, 2018 (15 pages).
International Preliminary Report on Patentability Chapter 1 for PCT Application No. PCT/CN2018/077280 dated Sep. 6, 2019 (11 pages).
First Search for Chinese Application No. 201710109091.6 dated Aug. 27, 2018 (1 page).
Written Opinion for Singaporean Application No. 11201907256Q dated Apr. 7, 2020.
Communication pursuant to Article 94(3) EPC for European Application No. 18757692.1 dated May 20, 2021.
Scott Hayden, "Hands On: SMIs Gear VR Eye Tracking is Accurate, Fast and Lightweight", Feb. 24, 2016.
Scott W. Greenwald et al., "Eye gaze tracking with google cardboard using purkinje images", Proceedings of the 22nd ACM Conference on Virtual Reality Software and Technology, Nov. 2, 2016.
Written Opinion for Singapore Patent Application No. 11201907256Q dated Mar. 2, 2022.
Office Action for Korean Application No. 10-2019-7024490 dated Nov. 19, 2020.
Office Action for Japanese Application No. 2019-546342 dated Nov. 17, 2020.
Communication pursuant to Article 94(3) EPC for European Application No. 18757692.1 dated Aug. 1, 2022.
Pupil Dev Team, "Blog—HTC Vive Eye Tracking Add On—Pupil Labs," Retrieved from Internet: https://pupil-labs.com/blog/news/htc-vive-eye-tracking-add-on/. Aug. 9, 2016.
Pupil Labs, "Unbox the Pupil Labs add-on," https://www.youtube.com/watch?v=HGMjJLnK2_4, Oct. 14, 2016.
Pupil Labs, "Take HTC Vive apart a bit more so we can show a close up view," https://www.youtube.com/watch?v=nlzuwHaglXQ, Oct. 14, 2016.

(56) References Cited

OTHER PUBLICATIONS

Pupil Labs, "Closeup of the add-on engagement with the lens holder," https://www.youtube.com/watch?v=zswmKmlBrss, Oct. 14, 2016.

Anthes et al., "State of the art of virtual reality technology," 2016 IEEE Aerospace Conference, IEEE, Mar. 5, 2016.

* cited by examiner

VIRTUAL REALITY HEAD-MOUNTED APPARATUS

CROSS-REFERENCE TO RELATED APPLICATION

This application is a continuation application of International Patent Application No. PCT/CN2018/077280, filed on Feb. 26, 2018, which is based on and claims priority of the Chinese Patent Application No. 201710109091.6, filed on Feb. 27, 2017 and entitled "VIRTUAL REALITY HEAD-MOUNTED APPARATUS." The above-referenced applications are incorporated herein by reference in their entirety.

TECHNICAL FIELD

This application relates generally to virtual reality (VR) technology, and more specifically, to a virtual reality head-mounted apparatus.

BACKGROUND

Virtual reality (VR) technology provides three-dimensional immersive scenes for a user by utilizing a computer graphics system and various control interfaces to generate an interactive environment on a computer. Existing techniques may create VR experience through a virtual reality head-mounted apparatus, such as VR glasses or a VR helmet.

However, due to unique characteristics of VR technology, techniques that work on traditional electronic devices, such as mobile phones or PCs, may not work well on a VR device. For example, to conduct identity verification for a user, conventional methods that based on password or gesture recognition may take too long to complete, if it can be completed at all, in a VR environment. Therefore, a VR device that can quickly and accurately perform identify verification without interrupting the user's immersive VR experience is desirable.

SUMMARY

In view of the limitations of exiting techniques described above, this application provides a virtual reality head-mounted apparatus. This apparatus may acquire eye pattern features of a user without interrupting virtual reality content, and may quickly and accurately perform identity verification on the user wearing the virtual reality head-mounted apparatus based on the acquired eye pattern features.

This application is directed to a virtual reality head-mounted apparatus. The apparatus may comprise: an apparatus body comprising a convex lens and a camera. The camera may be on a user side of the convex lens, and a lens of the camera may face an eye of a user for acquiring eye pattern features of the user.

In some embodiments, the camera may be located below the convex lens, and tilt upward by a first angle, so that the lens of the camera may face the eye of the user. In some embodiments, the camera may be located above the convex lens, and tilt downward by a second angle, so that the lens of the camera may face the eye of the user.

In some embodiments, the apparatus body may comprise two convex lenses, and the camera may be located on the user side of one of the two convex lenses for acquiring eye pattern features of the user corresponding to the one of the two convex lenses.

In some embodiments, the apparatus body may comprise two cameras and two convex lenses, the two cameras may be respectively located at the user side of the two convex lenses for acquiring eye pattern features of the user corresponding to each of the two convex lenses.

In some embodiments, the camera may be located outside a visible area of the convex lens with respect to the user.

In some embodiments, a position of the camera may be in contact with the convex lens.

In some embodiments, the camera may be an RGB camera or an RGB-IR camera.

In some embodiments, the apparatus body may further comprise: an apparatus interface; and an electronic device for displaying virtual reality convent. The apparatus interface may be electrically connected to the electronic device, and the camera may be connected to the apparatus interface through a data line. Upon receiving a switch control instruction from the electronic device through the apparatus interface and the data line, the camera may perform a status switching operation in response to the switch control instruction, and transmit the acquired eye pattern features to the electronic device through the apparatus interface and the data line.

In some embodiments, the apparatus may further comprise an adjustment component for performing angular adjustment for the camera, such that the lens of the camera may face the eye of the user.

In the virtual reality head-mounted apparatus disclosed in this application, the apparatus body may comprise a camera, with a lens of the camera facing an eye of a user for acquiring eye pattern features of the user. The acquired eye pattern features may be used for identify verification of the user. Thus, without interrupting the user's viewing of virtual reality contents, identity information of the user may be quickly and accurately verified by comparing and analyzing the eye pattern features. This apparatus provides improved user experience and security for virtual reality applications.

DETAILED DESCRIPTION OF THE INVENTION

Specific, non-limiting embodiments of the present invention will be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

In order to further illustrate this application, several embodiments are provided, using a VR helmet as an example, to introduce the structures of a virtual reality head-mounted apparatus of this application.

Figure 1:
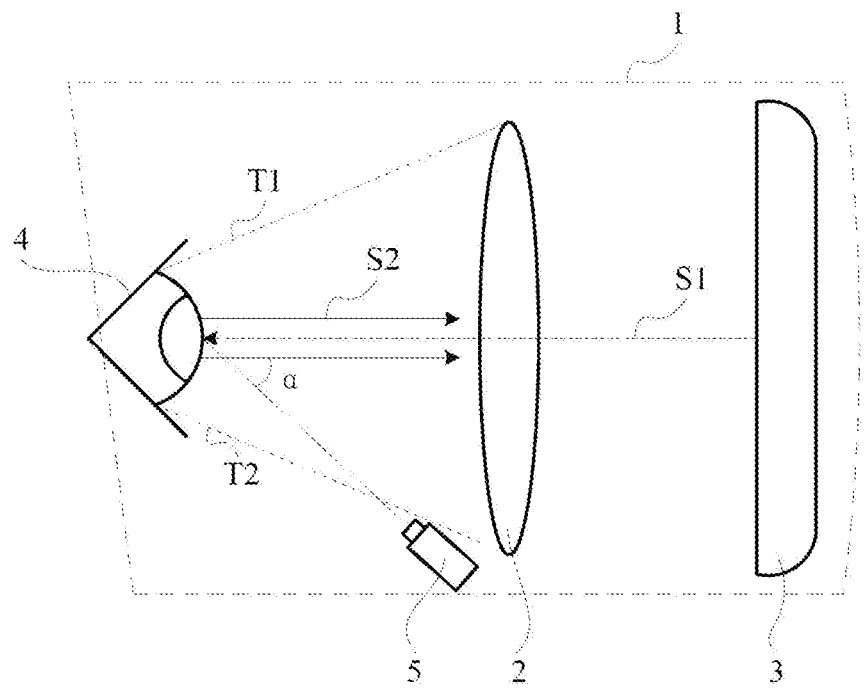
FIG. 1 is a side cross-sectional view of a VR helmet provided by a first embodiment of this application.

FIG. 1 is a side cross-sectional view of a VR helmet provided by an embodiment of this application. As shown in FIG. 1, the virtual reality head-mounted apparatus may comprise an apparatus body 1. The apparatus body 1 may comprise a convex lens 2 and a VR playing component 3. The convex lens 2 may be located between a user (an eye 4 of the user is shown in FIG. 1) and the VR playing component 3 in the apparatus body 1, so that VR display content played by the VR playing component 3 may, in a form of visible light S1, go through the convex lens 2 and reach the eye 4 of the user. The eye 4 of the user may receive the visible light S1 for viewing the VR display content.

Additionally, the apparatus body 1 may comprise a camera 5. The camera 5 may be located on a user side (i.e., left side of the convex lens 2 as shown in FIG. 1) of the convex lens 2, and a lens of the camera 5 may face an eye 4 of a user for acquiring eye pattern features of the user. The camera 5 may be an infrared radiation (IR) camera or an integrated red-green-blue (RGB)-IR camera, which is not limited in this application. Identity verification on a user wearing the VR helmet may be performed by comparing and analyzing the acquired eye pattern features of the user. Compared to conventional identity verification methods, such as those based on password or gesture recognition, the identify verification in the apparatus of this application is performed based on eye pattern features of users that are acquired by the camera 5 installed in the VR helmet. Therefore, it does not require any complicated structures and equipment being installed on the VR apparatus, or any separate and additional operations from the users. That simplifies the operations and improves the efficiency of identity verification.

In some embodiments, to avoid blocking the VR display content played by the VR playing component 3 (i.e., to avoid blocking the propagation of the visible light S1 from the VR playing component 3), the camera 5 may need to be placed outside of a visible area of the convex lens 2 with respect to the eye 4 of the user (e.g., the visible area may be an area enclosed by an upper boundary T1 and a lower boundary T2 as shown in FIG. 1). The camera 5 may be located at the bottom of the apparatus body 1, that is, the camera 5 may be located below the convex lens 2, and may tilt upward by a first angle, so that the lens of the camera 5 may face the eye 4 of the user.

While using the VR helmet, a user may maintain his/her eye 4 in a straight-looking state as shown in FIG. 1, thus the light S2 from the eye 4 may propagate substantially horizontally, and the line from the camera 5 to the eye 4 may form an angle α with the light S2. A large angle α may lead to severe deformation of the acquired eye pattern features, therefore the camera 5 may be disposed in contact with an edge of the convex lens 2 (in term of at least one of a horizontal distance and a vertical distance) to minimize the angle α without blocking the convex lens 2.

Figure 2:
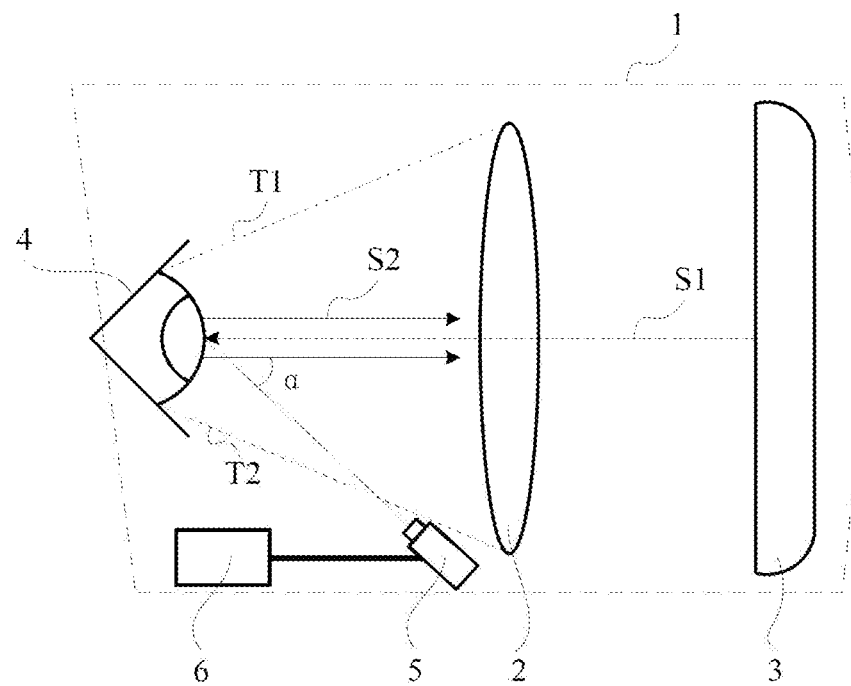
FIG. 2 is a side cross-sectional view of a VR helmet provided by a second embodiment of this application.

Additionally, as shown in FIG. 2, the VR helmet may include an adjustment component 6 that is electrically connected to the camera 5 and may perform angle adjustment for the camera 5, so that when different users use the same VR helmet, the adjustment component 6 may adjust the angle of the camera 5 to ensure that the lens of the camera 5 faces the eye 4 of the user, thereby reducing, if not eliminating, the distortion of the acquired eye pattern features.

Figure 3:
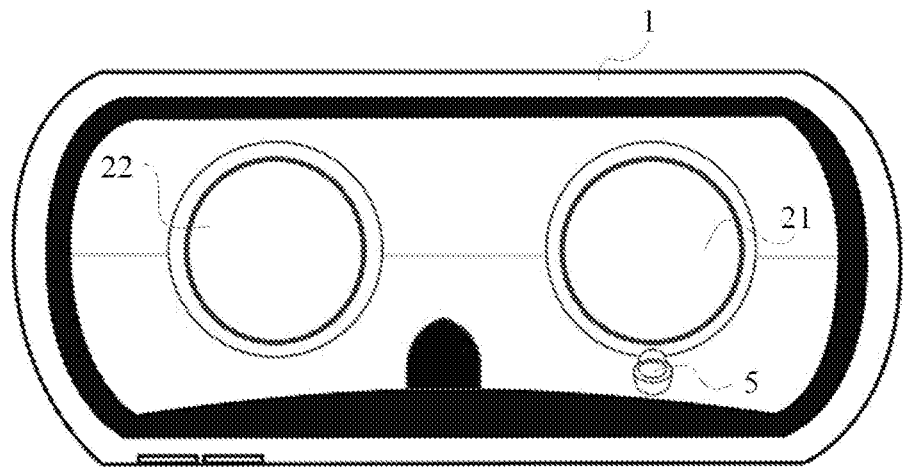
FIG. 3 is a structural diagram of a VR helmet provided by an embodiment of this application, viewed from an wearer's direction.

In the aforementioned embodiment, as shown in FIG. 1, in order to avoid blocking the visible light S1, the camera 5 may need to be positioned outside the visible area and thus cannot be at the same height as the eye 4 in a vertical direction. But in a horizontal direction (a direction perpendicular to the paper in FIG. 1), the camera 5's position may be chosen to minimize a horizontal angle between the lens of the camera 5 and the light S2. For example, since the eye 4 of the user is usually located at a center position of the convex lens 2 in the horizontal direction, the camera 5 may be located at the center position of the convex lens 2 in the horizontal direction as shown in FIG. 3. That reduces the deformation or distortion of the eye pattern features acquired by the camera 5.

In the aforementioned embodiment, the VR helmet may comprise two convex lenses 2 corresponding to the eyes of the user. For example, FIG. 3 shows a right convex lens 21 corresponding to a right eye of the user, and a left convex lens 22 corresponding to a left eye of the user. Depending on actual requirements, the apparatus of this application may comprise one or more cameras 5. For example, as shown in FIG. 3, the apparatus may comprise only one camera 5 disposed at the right convex lens 21 to acquire eye pattern features of the right eye of the user. Similarly, the apparatus may comprise only one camera 5 disposed at the left convex lens 22 to acquire eye pattern features of the left eye of the user. Certainly, the apparatus may comprise two cameras 5 disposed at the right convex lens 21 and the left convex lens 22 to respectively acquire eye pattern features of the right eye and the left eye of the user simultaneously or separately.

Figure 4:
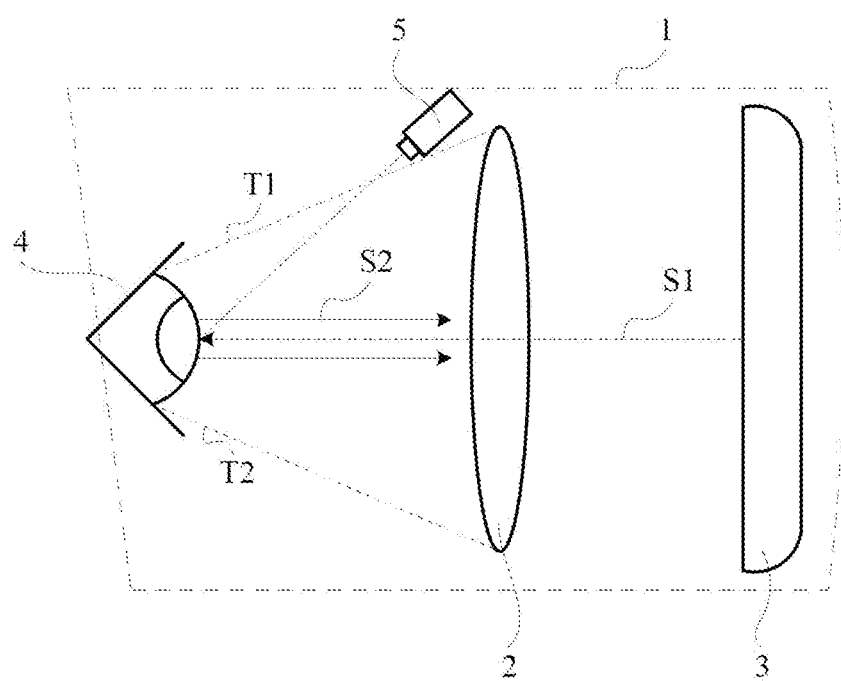
FIG. 4 is a side cross-sectional view of a VR helmet provided by a third embodiment of this application.

Although in the embodiments shown in FIGS. 1-3, the camera 5 is located at the bottom of the apparatus body 1 and below the convex lens 2. The camera 5 may be located at other positions as well, which is not limited in this application. For example, as shown in FIG. 4, the camera 5 may be disposed at the top of the apparatus body 1 and above the convex lens 2, so that the camera 5 may tilt downward by a second angle, and the lens of the camera 5 may face the eye 4 of the user for the acquisition of the eye pattern features. Similar to the embodiment shown in FIG. 2, the camera 5 in the embodiment shown in FIG. 4 may also be electrically connected to the adjustment component 6 for performing angular adjustment of the camera 5. Similar to the embodiment shown in FIG. 3, the camera 5 in the embodiment shown in FIG. 4 may also be disposed at a center position of the corresponding convex lens 2 in the horizontal direction (i.e., a direction perpendicular to the paper in FIG. 4) to reduce the deformation or distortion of the eye pattern features acquired by the camera 5. Detail implementation will not be repeated here.

Figure 5:
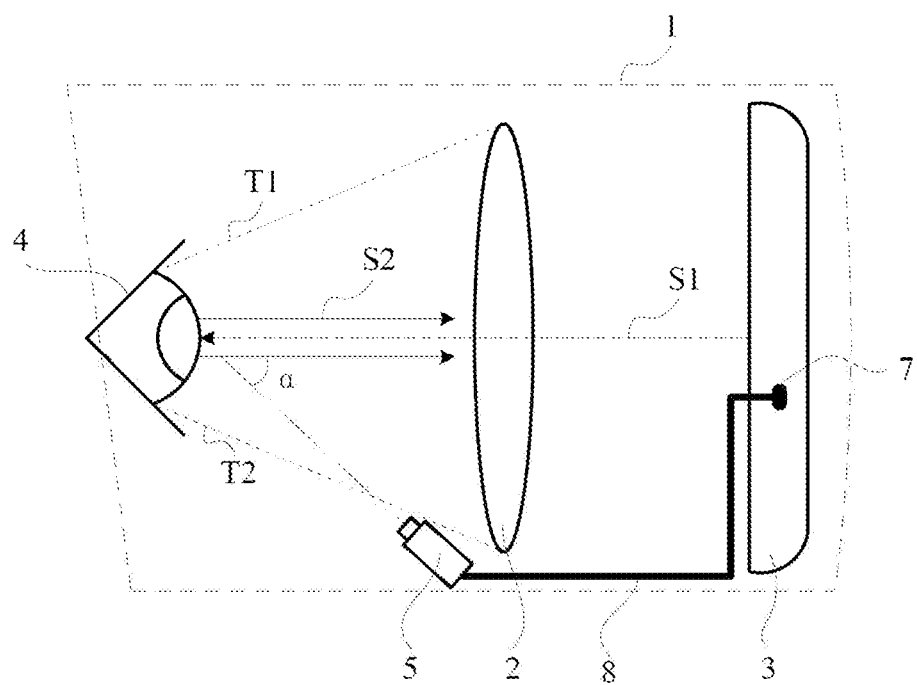
FIG. 5 is a side cross-sectional view of a VR helmet provided by a fourth embodiment of this application.

FIG. 5 is a side cross-sectional view of a VR helmet provided by an embodiment of this application. As shown in FIG. 5, the VR helmet may be a split VR head-mounted apparatus. The VR helmet may comprise an apparatus body 1 which comprises an apparatus interface 7 that is electrically connected to an electronic device such as a mobile phone or a tablet installed in the apparatus body 1. The electronic device may, by using a processor and a graphic card for image rendering, and a screen component for displaying VR display content, work as the VR playing component 3 in the apparatus body 1.

Additionally, the camera 5 in the apparatus body 1 may be connected to the apparatus interface 7 through a data line 8, so that when the electronic device connected to the apparatus interface 7 issues a switch control instruction, the camera 5 may receive the switch control instruction through the apparatus interface 7 and the data line 8, and perform a state switching operation in response to the switch control instruction. In other words, by controlling the electronic device or an application program running on the electronic device, the electronic device may send a switch control instruction to the camera 5, thereby controlling the camera 5 to acquire the eye pattern features of the eye 4. That improves the controllability of the eye pattern features acquisition.

Additionally, after the camera 5 completes the acquisition of the eye pattern features, if the VR helmet comprises a processing module, the acquired eye pattern features may be transmitted to the processing module of the VR helmet for processing of the acquired eye pattern features. Alternatively, the camera 5 may transmit, through the apparatus interface 7 and the data line 8, the acquired eye pattern features to the aforementioned electronic device for processing by the electronic device.

Other than a split VR head-mounted apparatus paired with an electronic device such as a mobile phone, the VR helmet of this application may include other forms of VR head-mounted apparatuses. For example, for the split VR head-mounted apparatus, the VR helmet may be accompanied by a PC host, a game console or another external apparatus. The VR playing component 3 may be a display component built into the VR helmet, etc., and the external apparatus may be used for rendering of VR display content. In some embodiments, the VR helmet may be an integrated VR head-mounted apparatus, that is, the VR helmet may be able to play VR display content without resorting to an external displaying apparatus, and the VR playing component 3 may be built-in in the VR helmet. The VR playing component 3 may have playing functions such as rendering and displaying of VR display content.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one . . . " does not exclude other same elements in the process, method, article or device which include the element.

Reference will be made in detail to exemplary embodiments, examples of which are illustrated in the accompanying drawings. The above description refers to the accompanying drawings in which the same numbers in different drawings represent the same or similar elements unless otherwise represented. The implementations set forth in the following description of exemplary embodiments do not represent all implementations consistent with this application. Instead, they are merely examples of apparatuses and methods consistent with aspects related to this application as recited in the appended claims.

The terms used in this application are merely for the purpose of describing specific embodiments, and are not intended to limit this application. The terms "a", "said" and "the" of singular forms used in this application and the appended claims are also intended to include plural forms, unless otherwise specified in the context clearly. It should also be understood that, the term "and/or" used herein indicates and includes any or all possible combinations of one or more associated listed items.

It should be understood that although the terms such as first, second, and third may be used herein to describe various information, such information should not be limited to these terms. These terms are merely used for distinguishing information of the same type from each other. For example, within the scope of this application, first information may also be referred to as second information, and similarly, second information may also be referred to as first information. Depending on the context, the term "if" as used herein may be interpreted as "when . . . " or "upon . . . " or "in response to determining."

The foregoing descriptions are merely exemplary embodiments of this application, but are not intended to limit this application. Any modification, equivalent replacement, or improvement made without departing from the spirit and principle of this application should fall within the protection scope of this application.

What is claimed is:

1. A virtual reality head-mounted apparatus, comprising:
an apparatus body comprising two convex lenses, an electronic device, and two cameras, the two cameras being respectively located at a user side of the two convex lenses for acquiring eye pattern features of a user corresponding to each of the two convex lenses, and a lens of a first camera of the two cameras directly facing an eye of the user for acquiring the eye pattern features of the user, the electronic device located on a side of the two convex lenses away from the user and configured for displaying virtual reality content and receiving the eye pattern features from the cameras,
wherein the apparatus further comprises an apparatus interface provided on the apparatus body on the side of the convex lens away from the user, the apparatus interface being electrically connected to the electronic device and the two cameras,
and the two cameras are configured to, upon receiving a control instruction transmitted by the electronic device through the apparatus interface, acquire, without relying on an optical surface of the electronic device, the eye pattern features, and send the acquired eye pattern features to the electronic device, and
wherein the electronic device is further configured to conduct, based on the eye pattern features, identity verification on the user without interrupting the displaying of the virtual reality content.

2. The apparatus of claim 1, wherein the first camera is located below a first convex lens of the two convex lenses, and tilts upward by a first angle, so that the lens of the first camera faces the eye of the user.

3. The apparatus of claim 1, wherein the first camera is located above a first convex lens of the two convex lenses, and tilts downward by a second angle, so that the lens of the first camera faces the eye of the user.

4. The apparatus of claim 1, wherein the first camera is located outside a visible area of a first convex lens of the two convex lenses with respect to the user.

5. The apparatus of claim 1, wherein the first camera is in contact with an edge of a first convex lens of the two convex lenses.

6. The apparatus of claim 1, wherein the first camera is an RGB camera or an RGB-IR camera.

7. A virtual reality head-mounted apparatus, comprising:
an apparatus body comprising a convex lens and a camera, the camera being on a user side of the convex lens, and a lens of the camera directly facing an eye of a user for acquiring eye pattern features of the user;
an apparatus interface; and
an electronic device for displaying virtual reality content and receiving the eye pattern features from the camera, and located on a side of the convex lens away from the user, the apparatus interface being electrically connected to the electronic device and located on the side of the convex lens away from the user, wherein the camera is connected to the apparatus interface through a data line, and, is configured to, upon receiving a switch control instruction from the electronic device through the apparatus interface and the data line, acquire, in response to the switch control instruction and without relying on an optical surface of the electronic device, eye pattern features, and send the acquired eye pattern features to the electronic device, wherein the electronic device is further configured to conduct, based on the eye pattern features, identity verification on the user without interrupting the displaying of the virtual reality content.

8. The apparatus of claim 1, further comprising:

an adjustment component for performing angular adjustment for the first camera, such that the lens of the first camera faces the eye of the user.

9. The apparatus of claim 7, wherein the camera is located below the convex lens, and tilts upward by a first angle, so that the lens of the camera faces the eye of the user.

10. The apparatus of claim 7, wherein the camera is located above the convex lens, and tilts downward by a second angle, so that the lens of the camera faces the eye of the user.

11. The apparatus of claim 7, wherein the camera is located outside a visible area of the convex lens with respect to the user.

12. The apparatus of claim 7, wherein the camera is in contact with an edge of the convex lens.

13. The apparatus of claim 7, wherein the camera is an RGB camera or an RGB-IR camera.

14. The apparatus of claim 7, further comprising:

an adjustment component for performing angular adjustment for the camera, such that the lens of the camera faces the eye of the user.

\* \* \* \* \*